(12) United States Patent
Garandet et al.

(10) Patent No.: US 8,956,481 B2
(45) Date of Patent: Feb. 17, 2015

(54) METHOD OF ASSEMBLING CARBON PARTS BY REFRACTORY BRAZING

(75) Inventors: Jean-Paul Garandet, Grenoble (FR); Denis Camel, Chambery (FR); Beatrice Drevet, Grenoble (FR); Nicolas Eustathopoulos, Grenoble (FR); Rana Israel, Grenoble (FR)

(73) Assignees: Commissariat a l'Energie Atomique et aux Energies Alternatives, Paris (FR); Institut National Polytechnique de Grenoble, Grenoble (FR)

( * ) Notice: Subject to any disclaimer, the term of this patent is extended or adjusted under 35 U.S.C. 154(b) by 12 days.

(21) Appl. No.: 13/062,394

(22) PCT Filed: Sep. 3, 2009

(86) PCT No.: PCT/FR2009/051665
§ 371 (c)(1),
(2), (4) Date: May 20, 2011

(87) PCT Pub. No.: WO2010/026341
PCT Pub. Date: Mar. 11, 2010

(65) Prior Publication Data
US 2011/0229711 A1  Sep. 22, 2011

(30) Foreign Application Priority Data

Sep. 5, 2008  (FR) ...................................... 08 55970

(51) Int. Cl.
*C03B 29/00* (2006.01)
*C04B 33/34* (2006.01)
(Continued)

(52) U.S. Cl.
CPC ............. *C04B 37/005* (2013.01); *B23K 35/005* (2013.01); *B23K 35/0233* (2013.01); *B23K 35/327* (2013.01); *C04B 35/573* (2013.01); *C04B 2235/425* (2013.01); *C04B 2235/5436* (2013.01); *C04B 2235/656* (2013.01); *C04B 2235/6565* (2013.01); *C04B 2235/6567* (2013.01); *C04B 2235/662* (2013.01); *C04B 2235/728* (2013.01);
(Continued)

(58) Field of Classification Search
CPC .......... B32B 31/26; B32B 37/00; B32B 7/08; B32B 31/20; B32B 9/00; B29C 65/00; C04B 37/00; C04B 2235/40; C04B 2235/401
USPC ................. 156/325, 89.11, 89.25, 89.28, 283
See application file for complete search history.

(56) References Cited

U.S. PATENT DOCUMENTS 3,101,403 A * 8/1963 Lewis et al. ................. 219/117.1
4,952,533 A   8/1990 Hongu
(Continued)

FOREIGN PATENT DOCUMENTS

EP  0 388 666 A1  9/1990
EP  1 829 843 A2  9/2007

OTHER PUBLICATIONS

International Search Report dated Apr. 26, 2010.

*Primary Examiner* — Alex Efta
(74) *Attorney, Agent, or Firm* — Scully, Scott, Murphy & Presser, P.C.

(57) ABSTRACT

The present invention relates to a method of assembling carbon parts using a braze based on silicon carbide. The invention also relates to the parts assembled using such a method.

10 Claims, 1 Drawing Sheet

(51) Int. Cl.
*B29C 65/00* (2006.01)
*C04B 37/00* (2006.01)
*B23K 35/00* (2006.01)
*B23K 35/02* (2006.01)
*B23K 35/32* (2006.01)
*C04B 35/573* (2006.01)

(52) U.S. Cl.
CPC ....... *C04B 2237/083* (2013.01); *C04B 2237/16* (2013.01); *C04B 2237/363* (2013.01); *C04B 2237/708* (2013.01)
USPC .................. 156/89.11; 156/89.25; 156/89.28; 156/283

(56) References Cited

U.S. PATENT DOCUMENTS

| | | | | |
|---|---|---|---|---|
| 5,021,107 A | * | 6/1991 | Holko | 156/89.25 |
| 5,079,195 A | | 1/1992 | Chiang et al. | |
| 5,474,849 A | * | 12/1995 | Graef et al. | 428/408 |
| 5,972,157 A | * | 10/1999 | Xue et al. | 156/285 |
| 5,993,905 A | * | 11/1999 | Sheehan | 427/294 |
| 6,174,605 B1 | * | 1/2001 | Xue et al. | 428/408 |
| 2008/0131665 A1 | * | 6/2008 | Suyama et al. | 428/149 |

* cited by examiner

METHOD OF ASSEMBLING CARBON PARTS BY REFRACTORY BRAZING

The present invention relates to a method for joining carbon parts by refractory brazing with a braze based on silicon carbide, the complex parts thereby obtained being particularly useful in the microelectronics and solar photovoltaic fields.

Carbon materials are widely used in many branches of industry. However, the fabrication of parts of complex shape is not generally easy. To overcome this difficulty, it is often preferred to fabricate basic elements having a simple structure, which are then joined to form the desired complex structure. At present, brazing is a technique that is commonly employed to prepare assemblies.

Graphite brazing has already been described in many works, often to investigate the joining of graphite to various metals [1-2], and also to itself [3] However, the brazes feasible today all contain metal elements and are therefore unacceptable in environments demanding the use of very pure silicon, such as microelectronics and solar photovoltaics.

It is precisely the object of the present invention to propose a novel brazing technique that satisfies this purity requirement.

In particular, the present invention proposes a technique for brazing carbon parts that is particularly advantageous in terms of purity of the braze formed.

More particularly, the present invention proposes a brazing technique for carbon parts based on the use of silicon as a brazing material.

The present invention proposes in particular a joining method requiring no other elements than carbon and silicon and therefore suitable in particular for the formation of parts dedicated more particularly to uses in the microelectronics and solar photovoltaic fields.

The present invention particularly exploits the fact that when liquid silicon is contacted with a carbon material, a layer of silicon carbide is formed by the reaction at their interface [4]. This reaction may continue until the formation of a layer having a thickness that typically varies between 10 and 20 μm and whose growth is limited by the diffusion of the carbon into its thickness. It is known that the infiltration depth of silicon into a carbon matrix mainly depends on the porosity of said matrix and on the temperature at which the two materials are contacted. On materials such as extruded graphite, centimeter-scale depths are often reached, whereas they are a fraction of a millimeter for fine-grained graphites. As for vitreous carbon, no significant infiltration is observed and the silicon carbide layer is only formed at the interface.

It is a further object of the invention to propose a brazing technique that provides accurate control of the infiltration of the liquid silicon in the carbon parts to be joined.

More precisely, the present invention relates to a useful method for joining at least two carbon parts having a particle size lower than 10 μm and comprising at least the steps consisting in:

a) positioning the carbon parts to be joined and a silicon element, in particular in the form of a silicon strip, said element being inserted between said parts, and b) maintaining the cohesive assembly under the effect of pressure and subjecting it to heating at a temperature above 1410° C. under inert atmosphere, to melt the silicon and form a joint containing at least one silicon carbide bridge at the interface of said parts.

In a preferred embodiment, the assembly obtained after step b) may be exposed via a consecutive step c) to a temperature higher than the temperature considered in step b) to consume all the molten silicon and form a silicon carbide joint on the whole surface of the interface of said carbon parts.

In consequence, the inventive method implies, in a first embodiment, the carrying out of its first two steps only and, in a second embodiment, the carrying out of at least the three steps a), b) and c).

Thus, according to the usual conditions considered for brazing (specifications on thermal cycling and/or stress behavior in particular), the invention can advantageously be varied either as a first embodiment, in which the mechanical strength of the assembly is obtained by isolated SiC bridges, or as a second embodiment, in which prolonged high-temperature annealing allows complete conversion of the silicon to SiC.

The joint obtained after step b) advantageously contains a plurality of silicon carbide bridges which may be discontinuously distributed on the surface of the interface.

The silicon carbide joint obtained after step c) is advantageously continuous.

According to the first embodiment, the braze prepared between two carbon parts by the inventive method is formed of a composite zone containing at least one silicon carbide bridge also called SiC junction point.

In the context of the present invention, a composite zone means a structure formed of at least two phases, graphite and silicon carbide, and possibly also containing (unreacted) silicon.

In the context of the present invention, an SiC junction point means a physical path between the two parts to be joined. Such a junction point may advantageously have a diameter of at least 1 μm with a length of 30 μm, for example. Such junction points are shown in FIG. 2.

In this alternative, all the initial silicon is not consumed. The surplus silicon is then generally essentially located at the two ends of the braze and can be removed therefrom, if necessary, by commonly known technologies.

According to the second embodiment involving the mandatory implementation of step c) in the inventive method, the braze is formed of a composite zone containing a silicon carbide joint at the interface of the two parts, produced on the whole length of said interface. In said second embodiment, the braze advantageously comprises less than 5% of residual solid silicon and, more particularly, no residual solid silicon. In the case in which the carbon parts to be joined have an open-cell porosity, the SiC joint present in the braze is laterally bordered by composite zones. All the molten silicon is converted to SiC, both in the joint and in the composite zone, without leaving any unreacted silicon in the pores of the graphite.

The use of silicon as a brazing material advantageously allows the preparation of carbon parts of complex shape which are, on the one hand, satisfactory in terms of purity, and therefore suitable for the most severe environments.

The brazes formed according to the second embodiment described above prove to be compatible with use at temperatures higher than the silicon melting point, and even up to 2000° C., because they are totally free of silicon.

Silicon Element

As a starting material, in addition to the carbon parts to be joined, the present method employs at least one silicon element.

As it appears from the above, said silicon element, when heated to a temperature above the melting point of silicon, is intended to be converted to molten silicon. The molten silicon, by interacting with the adjacent carbon surfaces, forms one or more SiC bridges between the two parts to be joined, or even an SiC joint on the whole length of said interface, and furthermore, if the carbon material is porous, a composite zone at the interface of the two parts.

In the first alternative, the embodiment according to the invention does not include step c), that is, all the molten silicon is not consumed. In the second alternative, it is completely consumed.

This silicon element may advantageously have dimensions and in particular an area adjusted to the areas of the faces of the two carbon parts to be joined.

Advantageously, it is a silicon plate or strip. Its thickness may vary between 50 and 800 µm, in particular between 300 µm and 500 µm.

The quantity of silicon, represented by the silicon element, must be adjusted according to the type of braze desired, the types of carbon parts to be joined, in particular their respective degrees of porosity and the temperature selected for carrying out step b), or even step c) if the latter is considered.

In fact, depending on the porosity of the two carbon parts to be joined, the reaction considered in step b) may also result in the deep infiltration of the molten silicon on either side of the interface of said parts, leading to the formation of a composite zone thicker than that obtained with carbon parts devoid of open-cell porosity, like vitreous carbon.

A person skilled in the art, through his general knowledge, is capable of adjusting the quantity of silicon with regard to the type of braze desired.

For example, the thickness of a silicon strip can be adjusted from 300 µm to 500 µm so that in the molten state in step b), under a pressure of 0.2 to 3 bar, the molten silicon forms a liquid joint having a thickness of 10 µm to 40 µm, in particular of 20 µm to 30 µm, at the interface of the two parts to be joined, which have a particle size distribution of 1 to 5 µm with an open-cell porosity of 0 to 40%.

Carbon Parts

More particularly, in the context of the present invention, a layer based on a carbon material is represented by a material formed essentially of carbon atoms.

More precisely, a carbon material, in the context of the invention, is a material having a content of carbon atoms higher than 95% by weight, in particular higher than 99% by weight with regard to its total weight.

Said material is more particularly graphite.

The inventive method is most particularly advantageous for carbon materials having a particle size of 1 to 10 µm, advantageously of 1 to 5 µm.

The method is also feasible for materials such as vitreous carbon. In this case, the thickness of the composite zone is practically zero, and all the processes take place exclusively at the interface between the two parts.

The porosity of the carbon materials may vary from 0% (case of vitreous carbon) to 40% by volume.

This porosity can be characterized by the mercury porosimetry method.

If the surface to be joined has planeity and/or roughness defects, these defects must be smaller than the desired thickness of the joint. If not, the surfaces must be ground.

As stated above, depending on the grade of graphite selected, it may be possible to form a joint and optionally a composite zone of variable size with regard to the rate of infiltration of the molten silicon into the pores (penetration of 0 to 1 mm).

The method is applicable to the brazing of parts having a broad dimensional range, the orders of magnitude of the parts typically varying from 1 millimeter to 1 meter.

The invention also relates to the parts joined by the method as previously described.

Others features and advantages of the invention will appear more clearly from a reading of the description that follows, provided for illustration and nonlimiting, with reference to the appended figures in which it should be noted that, for reasons of clarity, the various layers of material of the visible structures in the figures are represented in free scale; the dimensions of certain parts being highly exaggerated.

DETAILED DESCRIPTION OF EMBODIMENTS OF THE INVENTION

Step b)

During step b), the carbon parts to be brazed and the silicon part can be heated under controlled inert gas atmosphere at a temperature varying from 1410° C. (melting point of silicon) to 1600° C., advantageously from 1450° C. to 1550° C.

This heat treatment can be carried out for a period of 10 minutes to one hour, advantageously of 20 to 40 minutes.

These specificities of temperature and heating time can be optimized according to whether or not a consecutive step c) is carried out.

Thus, in the case in which the inventive method is carried out without step c), the temperature can advantageously be adjusted from 1450° C. to 1550° C. for a period of 10 minutes, or even 20 minutes to 40 minutes.

On the other hand, in the case in which the inventive method necessarily includes a step c), the temperature of the heat treatment carried out in step b) may vary from 1410° C. to 1500° C., in particular from 1430° C. to 1500° C., for a period of 10 minutes to 1 hour, or even 10 minutes to 40 minutes.

As for the pressure to be applied, it is advantageously adjusted so that the thickness of the liquid stream of molten silicon located between the two parts to be joined is equal to the desired thickness of the silicon carbide joint to be formed.

Figure 1:
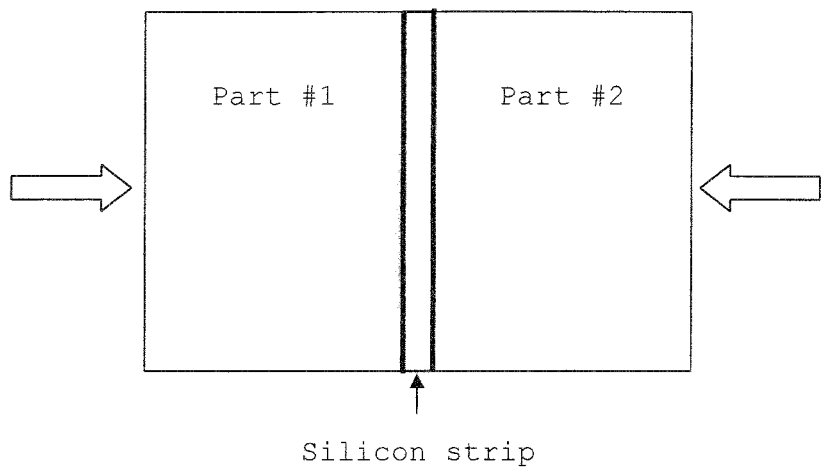
FIG. 1 is a schematic representation of two parts to be joined between which a silica strip is inserted.
Figure 2:
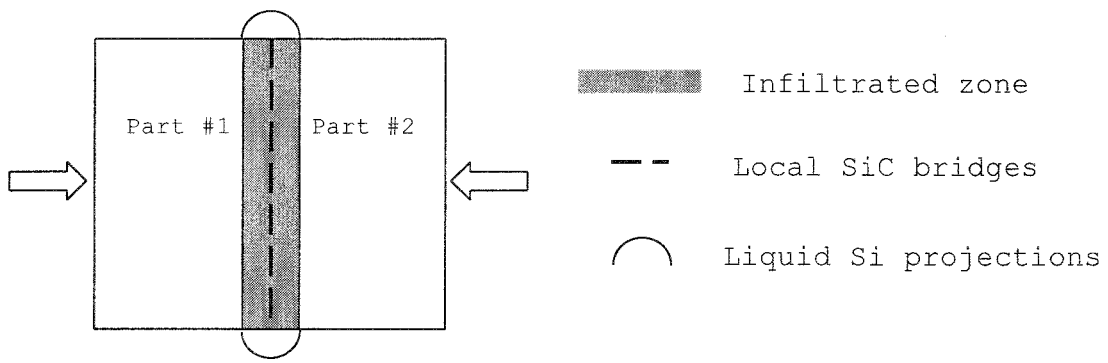
FIG. 2 is a schematic representation of the assembly in FIG. 1 which has been exposed to the heating conditions of step b).

This pressure also leads to the formation, at the two ends of the interface, of liquid Si projections on the exterior of the joint (see FIG. 2).

During this step b), several processes take place in parallel:
the formation of silicon carbide bridges by reaction at the locations where the roughness of the parts to be joined means that the distance between the parts is minimal, and in the case of part(s) having a porous graphite structure, the infiltration of the molten silicon until the time when the pores present at the interface are closed by reaction and formation of silicon carbide, thereby interrupting the supply of the infiltrated zone. At the end of this infiltration process, the maximum penetration depth is reached (see FIG. 2), and unreacted silicon subsists in the pores: this zone is the composite zone.

In conclusion, after this step b), localized SiC bridges are formed at the interface, the maximum infiltration depth in the carbon matrices of the two parts is reached, and liquid projections are formed under the effect of the pressure, on the side walls of the parts at the ends of the interface.

To control the excess liquid volume and to prevent the silicon from wetting the exterior of the graphite parts, expansion housings can be positioned on either side of the joint, as conventionally done in brazing processes.

Step c)

This step c), which can be carried out after step b), is similar to a second annealing level designed to obtain the formation of a joint at the interface, by the proliferation of SiC bridges and/or by the thickening of the existing bridges.

This second level can be obtained at a temperature of between 1500° C. and 1750° C., advantageously between 1600° C. and 1700° C.

Figure 3:
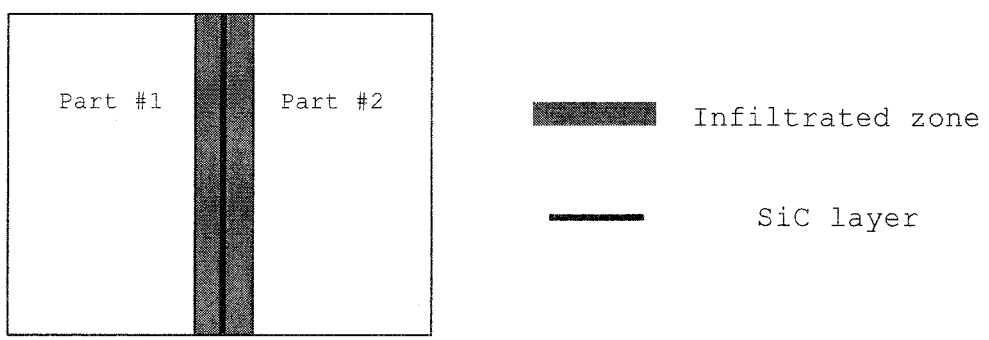
FIG. 3 is a schematic representation of the assembly in FIG. 2 which has been exposed to the conditions of step c).

The silicon present in the lateral projections is then transported by capillarity to the unreacted zones. At the same time, a maturation of the composite structure of the infiltrated zone is observed. This step c) is complete when the joint is formed and when all the silicon is consumed as shown in FIG. 3.

The annealing time of this second level may vary from 3 to 8 hours, preferably from 3 to 6 hours.

To ensure that after step b), the silicon forming projections on the side walls of the parts, which is, if applicable, recovered in expansion housings, fully returns to the still unreacted zones of the joint, surface channels can be etched in the parts to be brazed in order to transport the silicon.

Since these channels are themselves intended to be plugged due to the Si+C→SiC reaction, their diameter may advantageously be slightly greater than the thickness of the joint. In the case of as-machined materials, the surface roughnesses may suffice to transport the silicon.

The invention will now be described by means of the following example, which is obviously provided for illustration and nonlimiting.

Starting Materials:

The parts to be joined are Carbone Lorraine 2020 graphite parts, with 15% porosity by volume, and particle size 5 μm.

Silicon plate 10×10 cm² with thickness 500 μm.

EXAMPLE 1

The two carbon parts between which the silicon strip is inserted are kept cohesive with a pressure of 2.5 bar. The assembly is heated to 1500° C. under inert gas atmosphere (Argon U) for 30 minutes. The assembly is cooled to ambient temperature at the rate of 5° C./rain to 900° C. and then by natural cooling after the heating is stopped.

The braze thereby obtained is formed of a composite zone containing silicon carbide bridges.

EXAMPLE 2

The two carbon parts between which the silicon strip is inserted are kept cohesive with a pressure of 2.5 bar. The assembly is heated to 1460° C. under inert gas atmosphere (Argon U) for 10 minutes, and then heated to a temperature of 1600° C. for 5 hours. The assembly is then cooled to ambient temperature at the rate of 5° C./rain to 900° C. and then by natural cooling after the heating is stopped.

As opposed to the braze obtained in example 1, this braze is devoid of silicon. The depth of the infiltrated zone is 400 to 600 microns and the thickness of the SiC joint formed is 10 to 20 microns.

Documents Cited

[1] L. Yinquan, Z. Zhengde, D. Chaoquan and S. Yusheng, Materials Characterization 44 (2000) 425
[2] U.S. Pat. No. 6,877,651,
[3] U.S. Pat. No. 3,946,932,
[4] A. Favre, H. Fuzellier and J. Suptil, Ceramics International 29 (2003) 235.

The invention claimed is:

1. A method for joining at least two carbon parts having a particle size lower than 10 μm, the method comprising the steps of:
   a) positioning the carbon parts to be joined and a silicon element, said silicon element being inserted between said carbon parts, and
   b) maintaining the assembly formed in step a) cohesive under pressure and subjecting it to heating at a temperature between 1410° C. and 1500° C. under an inert atmosphere for a period of 10 minutes to 1 hour, to melt the silicon and form a joint containing at least one silicon carbide bridge at an interface of said carbon parts, and
   c) exposing the assembly obtained after step b) to a temperature higher than the temperature of step b) and between 1500° C. and 1750° C., for a period of 3 to 8 hours to consume all of the silicon and form a silicon carbide joint on the whole surface of the interface of said carbon parts.

2. The method as claimed in claim 1, wherein the silicon carbide joint obtained after step c) is completely devoid of residual solid silicon.

3. The method as claimed in claim 1, wherein the carbon parts have an open-cell porosity of 0 to 40% by volume.

4. The method as claimed in claim 1, wherein the carbon parts have a particle size of 1 to 5 μm.

5. The method as claimed in claim 1, wherein the joint formed at the interface of the two joined parts has a thickness between 10 and 40 μm.

6. The method as claimed in claim 1, wherein the silicon element in step a) is in the form of a silicon strip.

7. The method as claimed in claim 1, wherein the joint formed at the interface of the two joined parts has a thickness between 20 and 30 μm.

8. The method as claimed in claim 1, wherein step b) comprises the heating under inert atmosphere for 20 to 40 minutes.

9. The method as claimed in claim 1, wherein step b) is carried out at a temperature between 1430° C. and 1500° C.

10. The method as claimed in claim 1, wherein step c) is carried out at a temperature between 1600° C. and 1700° C.

* * * * *